United States Patent
Woodward et al.

(10) Patent No.: US 10,673,693 B2
(45) Date of Patent: Jun. 2, 2020

(54) RING BASED NETWORK INTERCONNECT

(71) Applicant: ELBIT SYSTEMS OF AMERICA, LLC, Fort Worth, TX (US)

(72) Inventors: Robert A. Woodward, Fort Worth, TX (US); Daniel M. Herring, Fort Worth, TX (US); Andrew W. Hull, Grapevine, TX (US)

(73) Assignee: ELBIT SYSTEMS OF AMERICA, LLC, Fort Worth, TX (US)

( * ) Notice: Subject to any disclaimer, the term of this patent is extended or adjusted under 35 U.S.C. 154(b) by 34 days.

(21) Appl. No.: 15/648,217

(22) Filed: Jul. 12, 2017

(65) Prior Publication Data

US 2017/0310544 A1    Oct. 26, 2017

Related U.S. Application Data

(63) Continuation of application No. 14/567,143, filed on Dec. 11, 2014, now Pat. No. 9,800,461.

(51) Int. Cl.
*H04L 12/24* (2006.01)
*H04L 12/46* (2006.01)

(52) U.S. Cl.
CPC ...... *H04L 41/0803* (2013.01); *H04L 12/4625* (2013.01); *H04L 41/0663* (2013.01); *H04L 41/12* (2013.01)

(58) Field of Classification Search
CPC ............. G06F 13/4221; G06F 13/4282; G06F 12/0831; H04L 45/74; H04L 49/15
See application file for complete search history.

(56) References Cited

U.S. PATENT DOCUMENTS

| | | | |
|---|---|---|---|
| 6,839,792 B2 | 1/2005 | Feldstein et al. | |
| 7,167,945 B2 | 1/2007 | Feldstein et al. | |
| 7,293,128 B2 | 11/2007 | Feldstein et al. | |
| 7,296,165 B2 | 11/2007 | Feldstein et al. | |
| 7,783,818 B1 | 8/2010 | Sardella | |
| 8,683,105 B1 * | 3/2014 | Shultz | G06F 3/1423 709/230 |
| 8,904,556 B1 | 12/2014 | Bertram et al. | |
| 9,361,249 B2 | 6/2016 | Satoh | |
| 2002/0169960 A1 | 11/2002 | Iguchi et al. | |
| 2006/0230217 A1 | 10/2006 | Moll | |
| 2008/0240134 A1 | 10/2008 | Gregg | |
| 2009/0022317 A1 | 1/2009 | Akima et al. | |

(Continued)

FOREIGN PATENT DOCUMENTS

EP    2808204    12/2014
WO    2013-013519    7/2013

OTHER PUBLICATIONS

PC I-Express AceXtreme(r) Data Sheet, Model BU-67302BOCOL-202, Data Device Corporation, 2012.

(Continued)

*Primary Examiner* — Jung H Park
(74) *Attorney, Agent, or Firm* — K&L Gates LLP (57) ABSTRACT

A network. At least some embodiments are a network including a first root node connected to a first port of a first switch and a second root node connected to a first port of a second switch. A first link is connected to a second port of the first switch and connected to a second port of the second switch. A second link is connected to a third port of a first switch and connected to a third port of the second switch.

8 Claims, 10 Drawing Sheets

(56) References Cited

U.S. PATENT DOCUMENTS

| | | |
|---|---|---|
| 2011/0112969 A1 | 5/2011 | Zaid et al. |
| 2012/0180507 A1 | 7/2012 | Leebow |
| 2012/0303177 A1 | 11/2012 | Jauch et al. |
| 2013/0179622 A1* | 7/2013 | Pratt .................. G06F 13/102 710/314 |
| 2013/0179722 A1* | 7/2013 | Smith ................ G06F 13/4027 714/4.5 |
| 2013/0227193 A1 | 8/2013 | Umar |
| 2014/0173167 A1* | 6/2014 | Choi .................. G06F 13/4022 710/316 |
| 2014/0195108 A1 | 7/2014 | Schumacher |
| 2014/0237156 A1 | 8/2014 | Regula |
| 2016/0154756 A1 | 6/2016 | Dodson |
| 2019/0278733 A1* | 9/2019 | Kessler .................. G06F 1/266 |

OTHER PUBLICATIONS

PCI Express System Architecture, Chapter 3, Address Spaces & Transaction Routing, Aug. 5, 2003, pp. 105-152.

PLX Technology and Avago Technologies, a Demonstration of PCI Express Generation 3 over a Fiber Optical Link, White Paper, Nov. 15, 2011, 9 pages.

Dolphin Interconnect Solutions, Dolphin Express IX Reflective Memory/Multicast, Whitepaper, Jun. 19, 2013, 8 pages.

Integrated Device Technology, PCI Express(r) Solutions, Product Overview, Aug. 14, 2014, 4 pages.

Budruk, Ravi et al., PCI Express System Architecture, MindShare, Inc., 2003, 222 pages.

PLX Technology, Product Brief, PEX 8717, PCI Express Gen 3 Switch, 16 Lanes, 10 Ports, Aug. 1, 2011, 5 pages.

Conley, Reginald, PCIe Goes 'Clock-less', PLX Technology, Independent SSC Operation without SSC Clock Isolation, White Paper, May 11, 2012, 9 pages.

PLX Technology. Product Brief. PEX8714. PCI Express Gen3 Switch, 12 Lanes, 5 Ports, Sep. 10, 2012, 4 pages.

* cited by examiner

RING BASED NETWORK INTERCONNECT

CROSS-REFERENCE TO RELATED APPLICATIONS

This application is a continuation of U.S. patent application Ser. No. 14/567,143 filed Dec. 11, 2014 and titled "RING-BASED NETWORK INTERCONNECT". U.S. patent application Ser. No. 14/567,143 is incorporated by reference herein as if reproduced in full below.

TECHNICAL FIELD

The present invention relates to bus networks and in particular to peripheral bus networks for airborne and vehicle-based electronics.

BACKGROUND

Computer-based electronic systems are ubiquitous in modern technologies. These computer-based systems typically have a processing unit (CPU) coupled to memory for storing instructions and data which are "consumed" by the CPU and a multiplicity of peripheral devices that serve to connect the CPU to the external environment. These peripheral devices may provide mass storage, user input/output (I/O), instrumentation and data collection, and the like. Connections between the various peripheral devices and the CPU may be effected via a network on which the CPU (typically through a network bridge) and the peripheral devices reside. One such industry standard network bus which is widely used is the Peripheral Component Interconnect (PCI), and its current version, Peripheral Component Interconnect Express (PCIe).

PCIe is a tree-based architecture with a root node (or root complex) and end-point nodes coupled thereto via one or more switches. Because of the tree-based architecture, PCIe may be susceptible to single-point failures (SPF) in which a failure on an intermediate link segment isolates the end-point nodes that are distal to the point of failure relative to the root node. In safety-critical applications, such as may be found in airborne or other vehicular computer system deployments, the susceptibility to single-point failures, and the mitigation thereof, may be a safety issue.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"End-point node means a device that natively resides on a bus and produces or consumes data on the bus. End-point nodes include, but are not limited to, bus-native storage devices, bus-native input/output (I/O) devices and signal interface devices.

"Link" means a full-duplex communication pathway of any width linking two root nodes and comprising one or more link segments.

"Link segment" means a communication pathway that is a part of a link.

"Root node" is a network node that includes logic and other circuitry for connecting a processor (CPU) to the network. In a Peripheral Component Interconnect Express (PCIe) network, the logic and other circuitry for connecting the CPU to a PCIe network is referred to as a root complex.

"Service point device" means a device that provides a network connection and interface between the network and a sensor.

"Sensor" means an end-point device that produces or consumes data in an interface that is not native to the network.

"Signal interface device" means a device that can be configured to connect to the network and provides an interface between a sensor and the network. A service point device may include a signal interface device.

"Exemplary means "serving as an example, instance, or illustration." An embodiment described herein as "exemplary" is not necessarily to be construed as preferred or advantageous over other embodiments.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
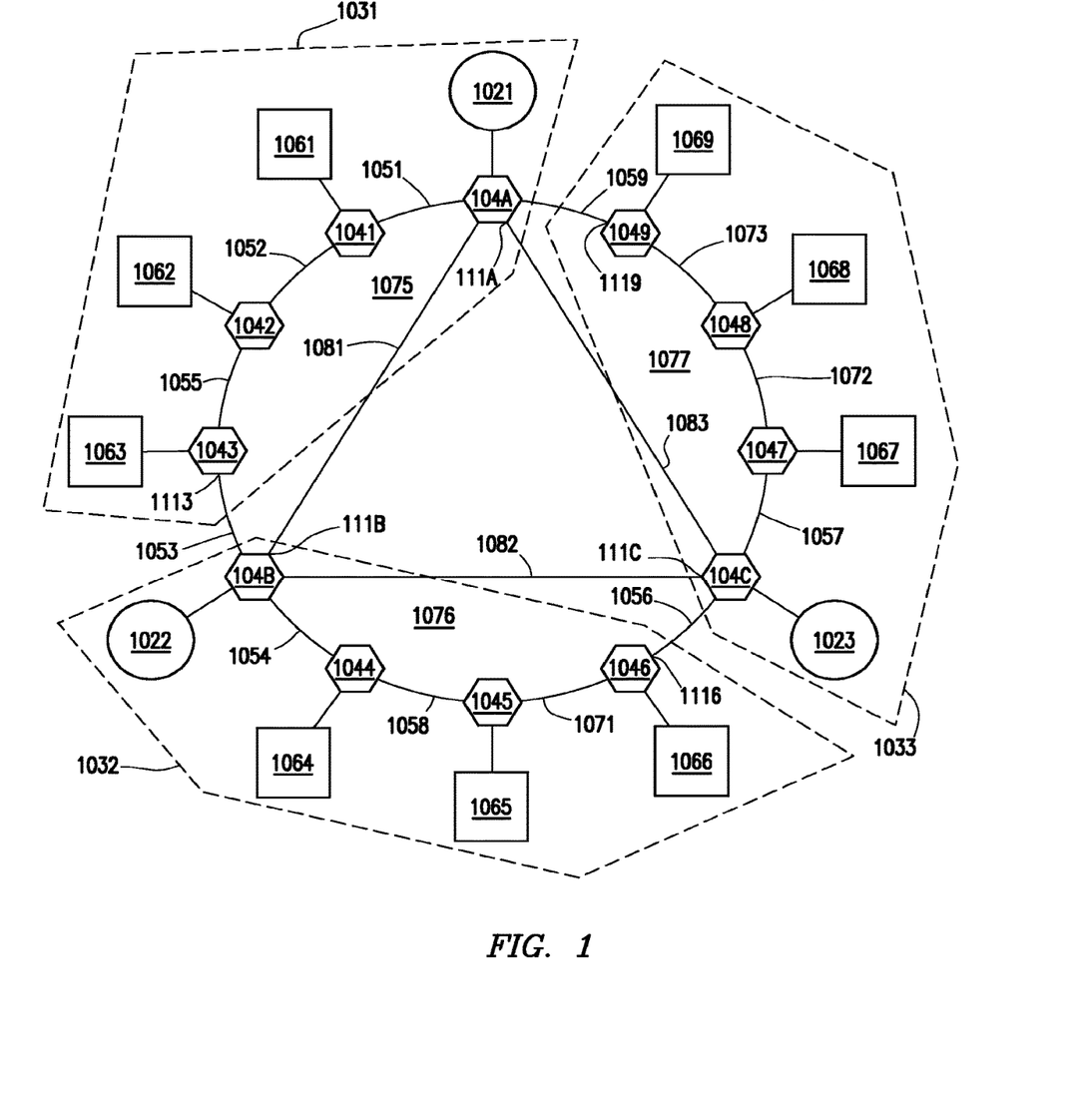
FIG. 1 shows a block diagram of a network in accordance with at least some embodiments.

Refer now to FIG. 1 illustrating a network 100 having a ring interconnect topology in accordance with a least some embodiments of the principles of the disclosure. Some embodiments of network 100 may be a Peripheral Component Interconnect Express (PCIe) network. PCIe is an industry-standard computer expansion bus. The PCIe specification is promulgated by the PCI-SIG, Beaverton, Oreg.

Network 100 includes root nodes 1021-1023, switches 104A-104C connected to root nodes 1021-1023, respectively and switches 1041-1049 connected by serial link segments as further described below. Root nodes 1021-1023 may include a processor (CPU) and, in the PCIe context, a root complex. End-point nodes 1061-1069 are coupled to respective ones of switches 1041-1049. As set forth above, end-point nodes 1061-1069 may include storage devices and input/output (I/O) devices, but are not limited to such devices. Other end-point device embodiments are described below in conjunction with FIGS. 7 and 8. For ease of illustration, each of switches 1041-1049 is shown with a single connected end-point node, 1061-1069. It would be readily appreciated, that network 100 is not limited to such embodiments, and any of switches 1041-1049 may have multiple connected end-point nodes. For example, in a PCIe environment, a commercially available switch may be the PEX8714 device from PLX Technology, Inc., San Jose, Calif., includes five ports. Thus, in the example network 100, a switch such a switch 1041 comprising a PEX8714 could support two additional end-point nodes, with one port connected to link 1051 and another to link 1052. The PEX8714 device is an example of a switch that may be used in embodiments of network 100 and other switches with differing numbers of available ports also may be used embodiments in accordance with the disclosed principles.

Switches 1041 and 1049 also are coupled by respective link segments 1051 and 1059 to switch 104A. Similarly, switches 1043 and 1044 are coupled by respective link segments 1053 and 1054 to switch 104B and switches 1046 and 1047 are connected by respective link segments 1056 and 1057 to switch 104C. A network link (or simply "link") may comprise one or more link segments. Links may be single segment links or multi-segment links. A link comprising a single link segment may simply be referred to as a link, and such single segment links will be clear from the context. For example, single-segment link 1081 connects switches 104A and 104B. Similarly, link 1082 connects switches 104B and 104C and link 1083 couples switch 104C and 104A. Links 1081-1083 couple root nodes 1021-1023 via the respective switches 104A, 104B and 104C. Multi-segment link 1075 includes link segments 1051, 1052, 1055 and 1053. Each link segment includes two ends, each end connected to a switch. For example, link segment 1051 has an end connected to switch 104A and another end connected to switch 1041. Similarly, link segment 1055 has an end connected to switch 1042 and another connected to switch 1043. Likewise, multi-segment link 1076 includes link segments 1054, 1058, 1071 and 1056; and multi-segment link 1077 includes link segments 1057, 1072, 1073 and 1059. Link segments convey electrical and/or data communication signals between network devices connected thereto.

Links 1081-1083 may connect to a non-transparent port on one of the respective switches 104A-104C. For example, ports 111A-111C in switches 104A-104C, respectively, may be non-transparent. Further, at least one of the ports connected to the link segments between switches 1041-1043, or between switches 1043 and 1046 may be non-transparent. Likewise, at least one of the ports connected to the link segments between switches 1044-1046, or between switches 1046 and 104C, and at least one of the ports connected to link segments between switches 1047-1049, or between switches 1049 and 104A may be non-transparent. For example, port 1116 in switch 1046 may be non-transparent. Similarly, ports 1113 and 1119 in switches 1043 and 1049 may be non-transparent. A non-transparent port may comprise a non-transparent bridge in which transactions crossing the bridge are address-translated between address spaces assigned on each side of the bridge. In such an embodiment, root node 1021 will not enumerate devices connected to switches 104B and 104C. Likewise root node 1022 will not enumerate devices connected to switches 104A and 104C, and root node 1023 will not enumerate devices connected to switches 104A and 104B. Responsive to a link failure, a port that is initially set as a non-transparent port may be unset and a port initially in transparent mode may be reset in non-transparent mode. This will be described further below in conjunction with the mitigation of single-point failures.

Figure 1A:
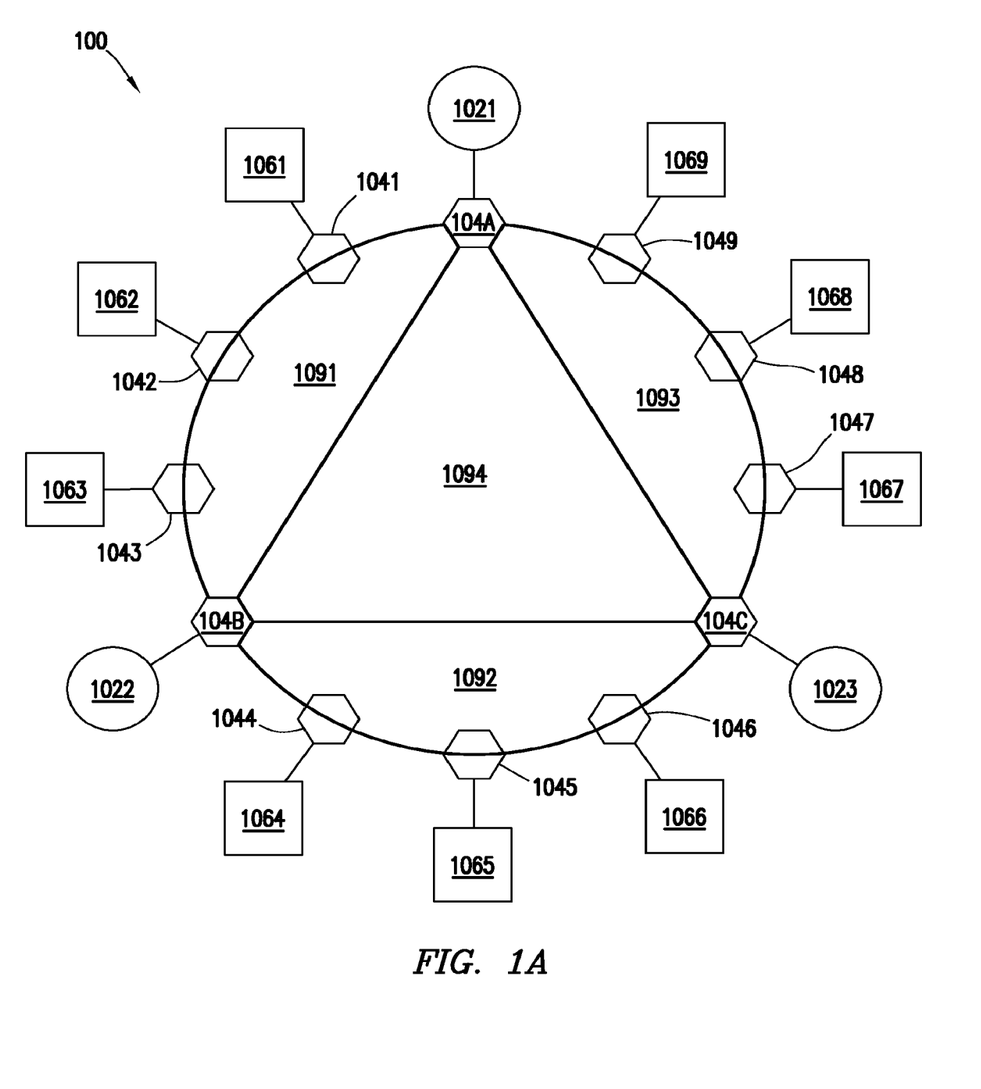
FIG. 1A shows aspects of the network of FIG. 1 in further detail.

Refer now to FIG. 1A, illustrating in further detail the ring-based interconnects of network 100. FIG. 1A shows a set of four ring interconnections (or simply "rings") 1091, 1092, 1093 and 1094, as traced by the bold lines shown in FIG. 1A. The bold lines are not intended to necessarily represent electrical or communication circuits, but to guide the eye in delineating the ring interconnections. As set forth above, link segments 1081-1083 may connect to a non-transparent port in switches 104A-104C. The operation of the ring interconnections in mitigating single-point failures will be described below. Each ring interconnection in accordance with the principles disclosed herein may include two or more network nodes. The examples in FIG. 1, rings 1091-1094 includes three or more network nodes, and each of the rings 1091-1094 includes at least two root nodes. For example, ring 1094 includes three root nodes 1021-1023. Further, each of switches 104A-104C connecting root nodes 1021-1023, respectively, to the network, provides three or more connections to the network. Each network device that is not a root node provides at least two connections to the network. For example, each of switches 1041-1049 provides two connections to the network.

Figure 2:
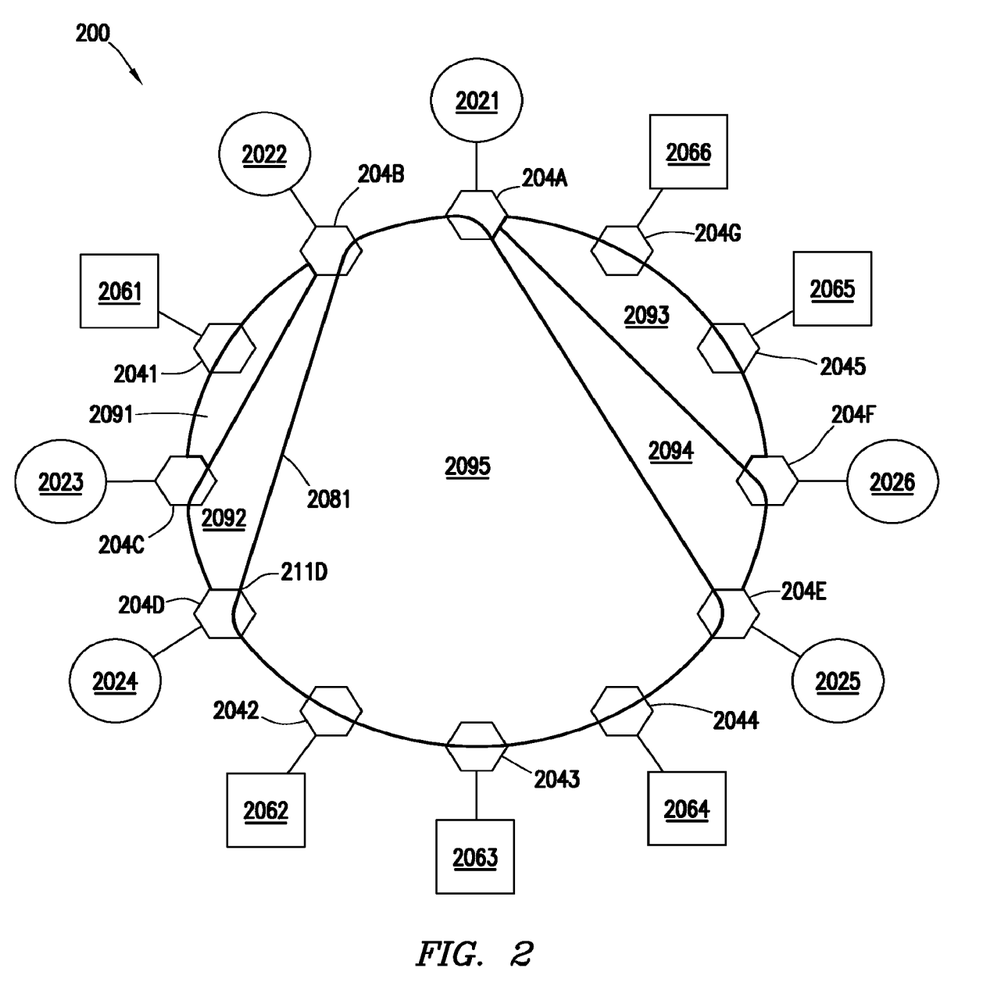
FIG. 2 shows a block diagram of a network in accordance with at least some embodiments.

The foregoing may be further appreciated by referring to FIG. 2 showing a network 200 having a ring interconnection topology in accordance with at least some embodiments. Network 200 includes five rings 2091-2095. As in FIG. 1A, the bold lines are to guide the eye in delineating the ring topology, and do not necessarily represent electrical or communication circuits. Network 200 includes root nodes 2021-2026, coupled to the network via switches 204A-204F, respectively. Similarly to link segments 1081-1083 in FIG. 1, link 2081, for example, between switches 204B and 204D may connect to a non-transparent port on one of switches 204B and 204D, say port 211D, to segregate root nodes 2022 and 2024, and their respective end-point device domains, as described further below. As in network 100, each of rings 2091-2095 includes at least three root nodes, and each of the switches 204A-204F associated with the respective root node provides at least three connections to the network. Network 200 also includes end-point nodes 2061-2066 connected to the network via switches 2041-2046, respectively. Also similarly to network 100, each of network switches 2014-2046 provides two connections to the network.

Returning to FIG. 1, the architecture of network 100 is further considered. Each of root nodes 1021-1023 may be associated with a respective domain 1031-1033. Root node 1021 may include a root complex for domain 1031. Similarly, root nodes 1022 and 1023 may include a root complex for domains 1032 and 1033, respectively. On initiation of network 100, each of root nodes 1021-1023 may enumerate the various devices on the network, or generate an address translation mapping if a device is connected to network 100 via a non-transparent port. For example, as described above, link segments 1081-1083 between switches 104A-104C may be connected via a non-transparent port in each one of the switches 104A-104C. In this way, the root nodes, and their respective domains 1031-1033 may be segregated, and communication between the root nodes (and their respective domains) effected via an address mapping between the root nodes and also between the devices in each of the respective domains thereof. In a PCIe context, the view of each network device is as a memory space, although network devices, end-point nodes in particular, are not necessarily memory as such. Thus, the root node address space may be referred to as a mapped address space and the mapping of a network device into the mapped address space as device address mapping. Communication with the network device uses its mapped address. Stated otherwise, data may be sent to a network device by a write to its mapped address and received from a network device by a read from its mapped address as if the network device were memory, although a network device need not be limited to a memory device.

Figure 3:
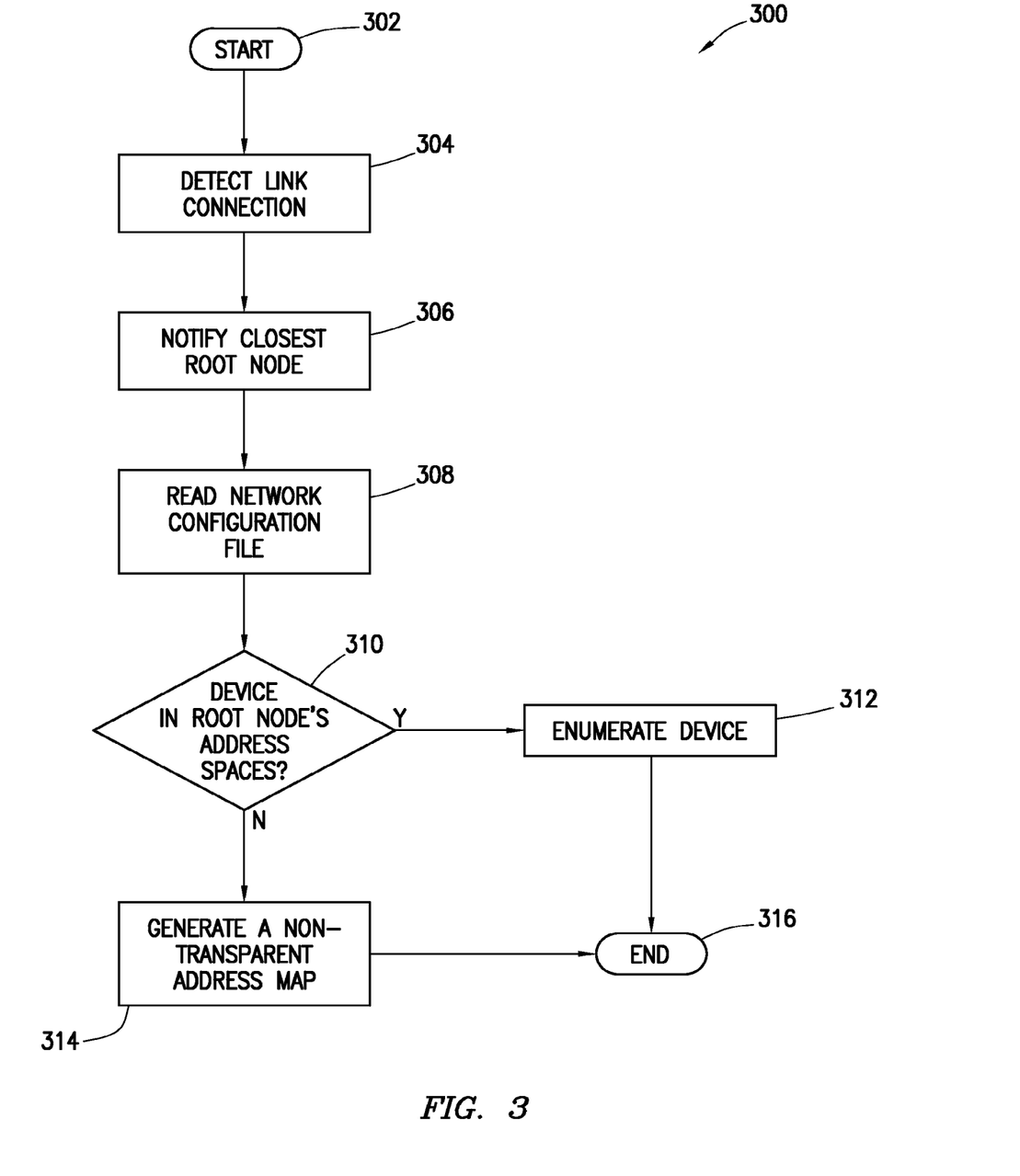
FIG. 3 shows a flowchart of a process in accordance with at least some embodiments.

The foregoing may be further appreciated by referring to FIG. 3 illustrating process 300 for initiating the ring network interconnection architecture in accordance with at least some embodiments. Process 300 starts at block 302 and at block 304 a link connection is detected by a network device. The detecting network device notifies the nearest root node that it has connected to network, block 306. In an embodiment based on a PCIe bus, the detection and notification may be effected via the hardware supporting the PCIe hot-plug capability within a PCIe switch. The root node notified in block 306 reads a network configuration file stored therein, block 308. The network configuration file specifies the network connection topology at start-up. In other words, the network configuration file specifies the configuration, or layout of the network at start-up. In particular, in a PCIe environment, the network configuration specifies the layout of the memory-mapped address space for each root node and the addresses assigned to each network device. In block 310, the notified root node determines, based on the configuration file, if the notifying device is in the root node's address space. If so, process 300 proceeds by the "Y" branch of block 310 and enumerates the device, block 312. In this way, the notifying device may then be informed of its address within the root node's address space. Otherwise, process 300 proceeds by the "N" branch of block 310 and, in block 314, sets up a non-transparent address mapping between the root node's address space and the address space of the notifying device as specified in the configuration file.

In at least some embodiments, the network configuration may be static. That is, the network, once initialized in accordance with the configuration as set forth in the static configuration file, does not change architecturally, absent a single-point failure and recovery therefrom, as described further below. This prevents, for example, a new device from joining the network. Such a static configuration may be advantageous in a network employed in a system in which safety and/or security are paramount, such as a network that is part of an airborne or other vehicular electronics system. Further, in such systems, the configuration file may be digitally signed to prevent unauthorized modification of the configuration file.

Figure 4:
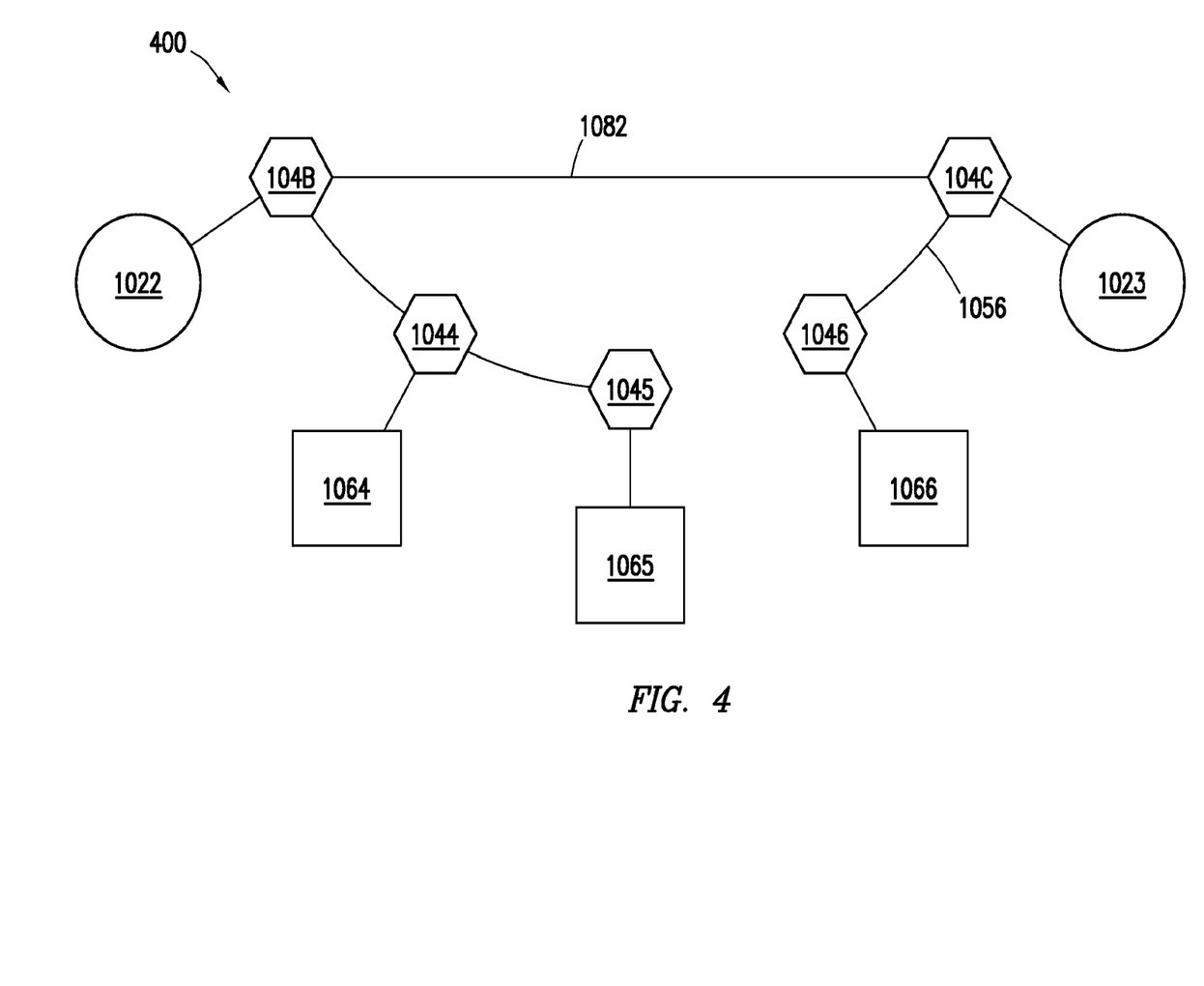
FIG. 4 shows a block diagram of a portion of a network in accordance with at least some embodiments.

Refer now to FIG. 4 showing a portion 400 of network 100. Portion 400, is but for the illustrated SPF comprised of ring 1092, FIG. 1A. The SPF is shown as a missing link segment to represent a link failure between switch 1045 and switch 1046. As initialized, root node 1022 may be the root node of switch 1046 and end-point node 1066 connected thereto. Recall, as discussed above in conjunction with FIG. 1, port 111C in switch 104C may be a non-transparent port. Thus, in this exemplary case, any communication between, say, root node 1022 and end-point device 1066 is routed through root node 1023 via link segment 1082. Consequently, in this example SPF, switch 1046 and any devices connected thereto such as end-point node 1066, are isolated. To further appreciate an SPF recovery in accordance with at least some embodiments, an exemplary network and associated state diagram for a state machine for controlling the network in response to link failures will be described in conjunction with FIGS. 5A and 5B. A process for recovering from the SPF will be described below in conjunction with FIG. 6.

Figure 5A:
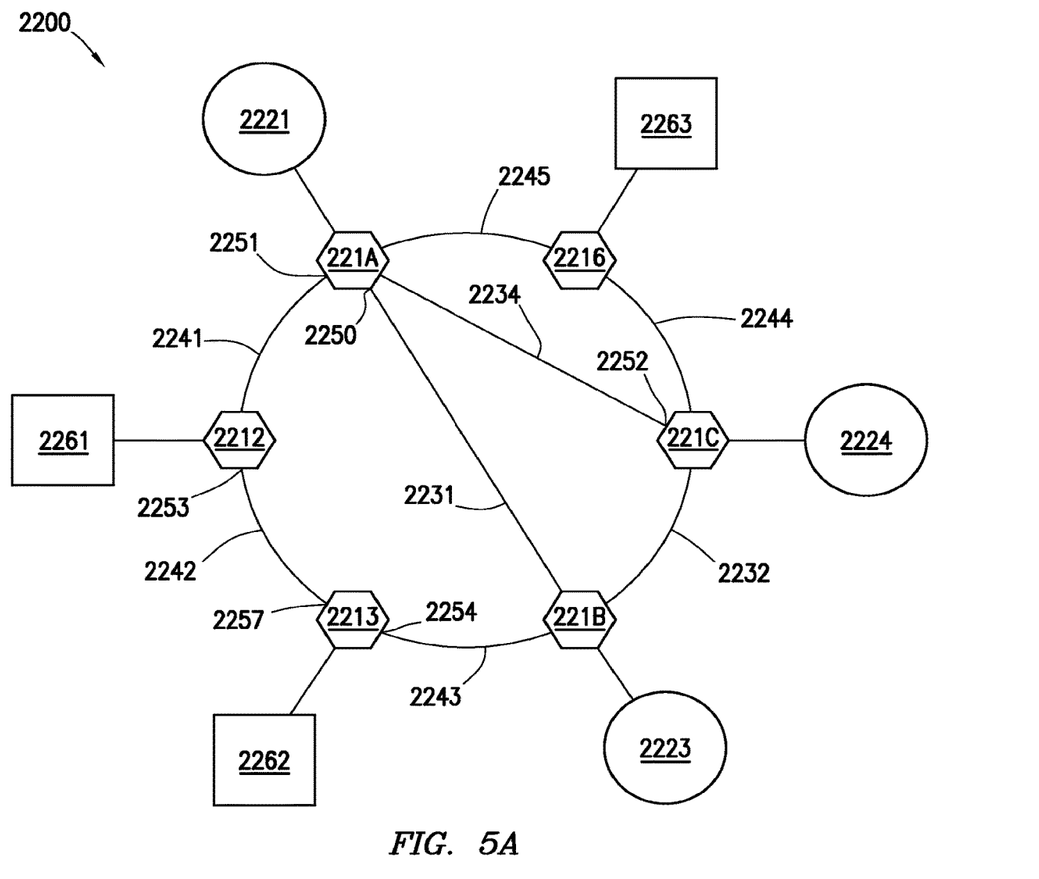
FIG. 5A shows a block diagram of a network in accordance with at least some embodiments.
Figure 5B:
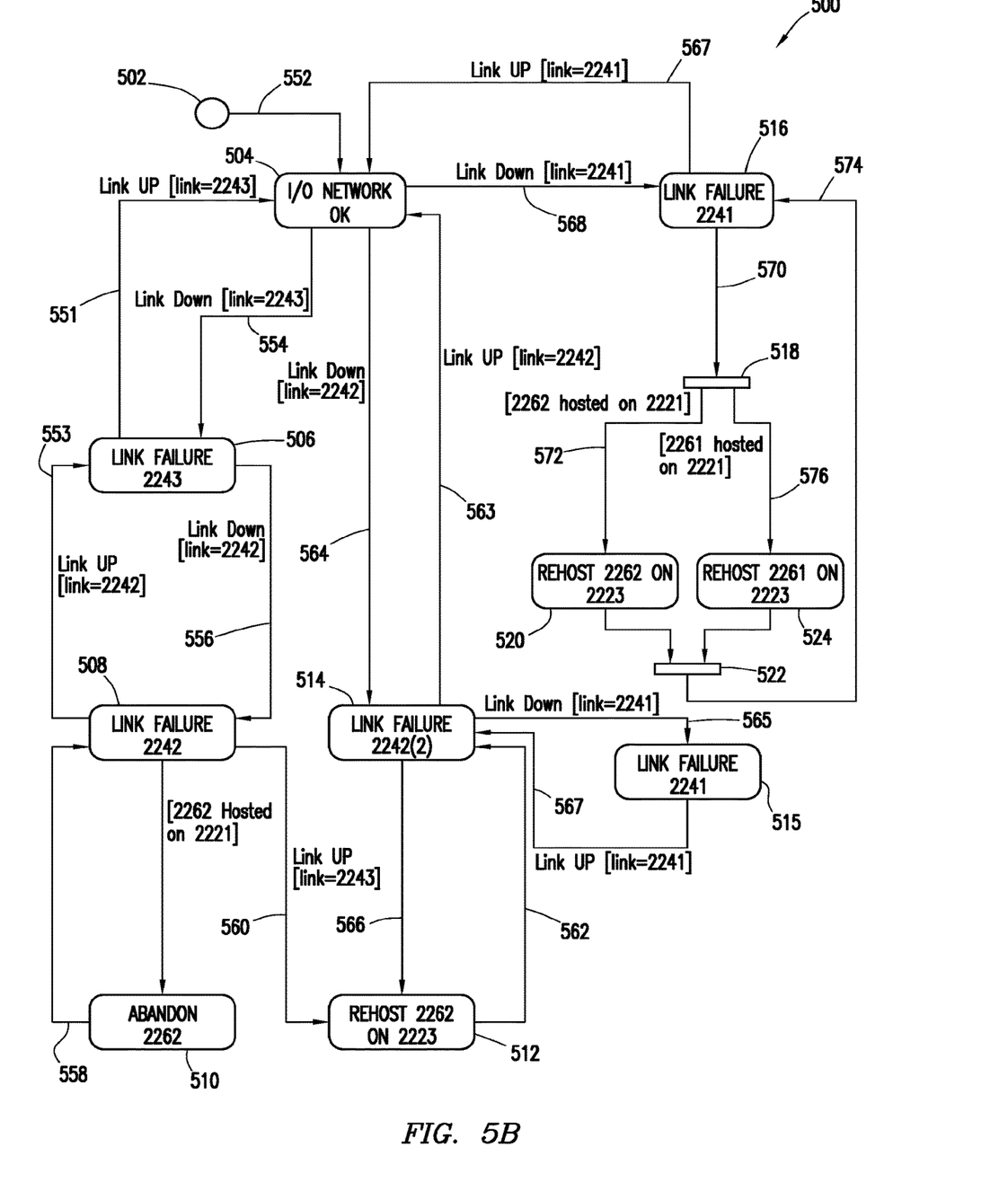
FIG. 5B shows a state diagram of a portion of a state machine for controlling the configuration of the network of FIG. 5A.

Turn now to FIGS. 5A and 5B showing, respectively, an exemplary network 2200 and, in state diagram form, a portion of a state machine 500 for controlling network 2200. Network 2200 includes root nodes 2221, 2223 and 2224. Each of root nodes 2221, 2223 and 2224 may include one or more CPUs and, in a PCIe context, a root complex. Root nodes 2221, 2223 and 2224 are connected to network 2200 via switches 221A-221C, respectively. Network 2200 also comprises end-point nodes 2261, 2262 and 2263 which are coupled to network 2200 via switches 2212, 2213 and 2216, respectively. Similar to network 100, FIG. 1, network 2200 incorporates ring interconnections. In network 2200, the ring interconnections include links 2231, 2232 and 2234. Similarly, another ring interconnection includes link 2231 and link segments 2243, 2242 and 2241, and still another ring interconnection comprises link 2234 and link segments 2244 and 2245. (Recall single-segment links may simply be referred to as links.) Links 2231 and 2234 may be non-transparent links wherein a port, e.g. port 2250 in switch 221A and port 2252 in switch 221C is a non-transparent port. As described further below in conjunction with FIG. 5B, root node 2221 may comprise a root complex for a network chain including switches 221A, 2212 and 2213; the end-point devices connected to switches 2212 and 2213, 2261 and 2262, respectively; and the link segments therebetween, link segment 2241 between switches 221A and 2212 and link segment 2242 between switches 2212 and 2213.

Upon initialization of network 2200, the network is in a setup state 502 which is outside of the state machine 500 and may be before the state machine starts. The setup state may be defined in a static configuration file, as previously described. By way of an example setup state 502, root node 2221 may set up switch 2211 such that link segment 2241 is a transparent link segment on the root domain of root node 2221. In other words, port 2251 on switch 2211 may be set up as transparent port. Root node 2221 may also set up switch 2212 such that the link segment 2242 is transparent wherein port 2253 is set as a transparent port. Further, root node 2221 may set up switch 2213 such that link segment 2243 is non-transparent (NT) wherein port 2254 is set as a non-transparent port.

After the setup state 502, the system enters via path 552, the "I/O Network OK" state 504, where depending on Link Up/Down events the state machine transitions to other states. A "Link Down" event is caused when the hardware detects the link segment disconnection. A "Link Up" event is caused when the hardware detects a link segment that was previously disconnected becomes connected. For example, as described above, in the PCIe context, hardware may detect link disconnections and connections by via the hardware supporting the PCIe hot-plug capability within a PCIe switch.

Consider, by way of example, a link failure of link segment 2243 that causes the "Link Down [link=2243]" event 554 with link segment set to 2243. State machine 500 changes state to the "Link Failure 2243" state 506, and waits there. As that link segment is in a non-transparent mode, as set in the setup state, no devices on that link are actively using the link to communicate. If link segment 2243 reconnects, "Link Up [link=2243]" event 551, state machine 500 returns to state 504. Otherwise, if link segment 2242 also fails, the system enters the "Link Failure 2242" state 508 via a "Link Down [link=2242] event" 556 at which point the device 2262 becomes unreachable and the state machine enters the "Abandon 2262" state 510 where the services provided by device 2262, hosted on root node 2221, as shown, are no longer accessible, and returns, at path 558, to state 508. If link segment 2242 reconnects, "Link Up [link=2242]" event 553, state machine 500 returns to state 506. When link segment 2243 becomes reconnected, the state machine transitions, at "Link Up [link=2243]" event 560, to "Rehost 2262 on 2223" state 512. Root node 2223 may then initiate a network reconfiguration and sets the link control for link segment 2243 in switch 2213 to be upstream and the link control for link segment 2242 in switch 2213 to be non-transparent. Stated otherwise, port 2254 is set to an upstream port, and port 2257 in switch 2213 is set to a non-transparent port. This allows for link segment 2242 to be reconnected without root node 2221 assuming control of device 2262, while allowing root node 2223 to be the root complex for end-point node 2262. This is the "Rehost 2262" state 512. The state machine transitions, at path 562 to the "Link Failure 2242 (2)" state 514. State machine 500 returns to I/O Network OK state 504 on detection of a "Link Up [link=2242]" event 563.

The state machine can also enter the "Rehost 2262" state 512 if the network is in the "I/O Network OK" state 504, and a "Link Down [link=2242]" event 564, is detected for link segment 2242, at which point the re-hosting described above occurs, via path 566 and returns to "Link Failure 2242 (2)" state 514 via path 562. If link segment 2242 reconnects, as previously described, state machine 500 returns to I/O Network OK state 504 on detection of the "Link Up [link=2242]" event 563. Otherwise, in state 514, on detection of a link failure on link segment 2241, the "Link Down [link=2241]" event 565 transitions the state machine to "Link Failure 2241" state 515. A reconnection of link segment 2241 transitions state machine 500 to state 514 via "Link Up [link=2241]" event 567.

If state machine 500 is in a state accessed by transitioning from state 504 via "Link Down [link=2243]" event 554, state machine 500 may not include a mechanism to handle a link segment 2241 failure because such a failure could not be handled if link segment 2243 is also disconnected, as devices 2261 and 2262 are then completely disconnected from the system.

In the "I/O Network OK" state 504, if a "Link Down [link=2241]" event on link 2241 occurs, path 568, then the state machine enters the "Link Failure 2241" state 516. If link 2241 reconnects, "Link Up[link=2241]" event 556, state machine 500 returns to state 504. Otherwise it starts the process via path 570 and fork 518, to rehost end-point node 2261 and/or end-point node 2262 depending if they are currently being hosted by root node 2221. If end-point node 2262 is hosted on root node 2221, end-node 2262 is re-hosted on root node 2223, via path 572 and "Rehost 2262 on 2223" state 520. State machine 500 returns via join 522 and path 574 to "Link Failure 2241" state, 516. Returning to fork 518, if end-point node 2261 is hosted on root node 2221, state machine 500 proceeds via fork 518 and path 576 to "Rehost 2261 on 2223" state 524. State machine 500 returns via join 522 and path 574 to "Link Failure 2241" state 516. State machine 500 may include path 570 to account for the possibility that end-point node 2262 may have already been re-hosted on root node 2223 from root node 2221.

As the foregoing description and FIGS. 5A and 5B show, the re-hosting process starts by reconfiguration of the links involved, such that the root complex for that part of the network is transparent to the device and the non-transparent port is moved to isolate the rest of the downstream network. Then the devices are enumerated and the drivers for those devices may be loaded on the new host, or if the software may not be loaded, the address mapping becomes accessible to the software running on root node 2221 via the non-transparent link 2231 using a specific address mapping such that direct accesses to end-point node 2262 are routed from root node 2221, through switch 221A, link 2231, switch 221B, link segment 2243, and switch 2213, to end-point node 2262.

Figure 6:
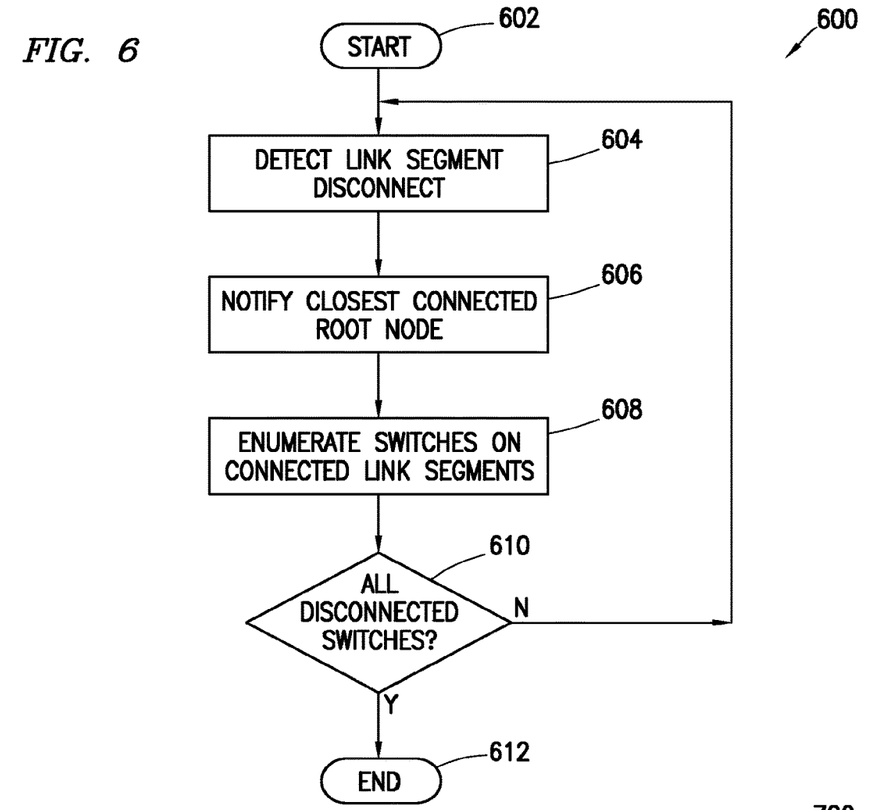
FIG. 6 shows a flowchart of a process in accordance with at least some embodiments

FIG. 6 illustrates a flow chart of a process 600 for SPF recovery in accordance with at least some embodiments. Process 600 starts at block 602. In block 604, a link segment disconnection is detected. In an embodiment based on a PCIe bus, a hotlink detection/disconnection notification may be through a hardware interrupt generated by a network switch. In other embodiments, polling of the link state may be used to detect a link segment disconnection. The network device detecting the link segment disconnect, a switch for example, notifies the closest connected root node of the link segment disconnect, block 606. Thus, by way of example in the context of FIG. 4, the notifying network device may be switch 1046. The notified root node enumerates the switches on the link segments where the failure was reported, block 608. Again, in the exemplary context of FIG. 4, with root node 1023 as the notified root node, non-transparent port 1116 may be unset, switch 1046 on link segment 1056 enumerated, and root node 1023 becomes the root node for switch 1046 and its end-point node 1066. Blocks 604-606 are performed by each of the disconnected switches, illustrated by the loop in block 610 via the "N" branch thereof. Although blocks 604-608 are depicted serially for ease of illustration, they are not necessarily performed serially. The detection of a link segment disconnection, block 604, and the other actions in blocks 606 and 608 may be performed by the respective network devices substantially in parallel. Process 600 ends at block 612 upon completion of the actions by the disconnected switches, as depicted by the "Y" branch of block 610.

As described above, the ring-based interconnect topology in accordance with embodiments of the disclosure, network devices may be deployed in an environment in which safety and/or security are issues, such as a network that is part of an airborne or other vehicular electronics system. Such systems may include a multiplicity of electronic devices that generate data and signals that may then be aggregated and communicated to other devices that may, for example, process the data. In such safety and security sensitive systems, the distribution of data within the system may be effected using network having a ring-based interconnect network with an SPF recovery mechanism in accordance with the principles described herein. A device, referred to herein as a service point device, that may be used in conjunction therewith to connect various electronic devices such as electronic devices in an airborne or vehicular electronics system will now be described in conjunction with FIG. 7.

Figure 7:
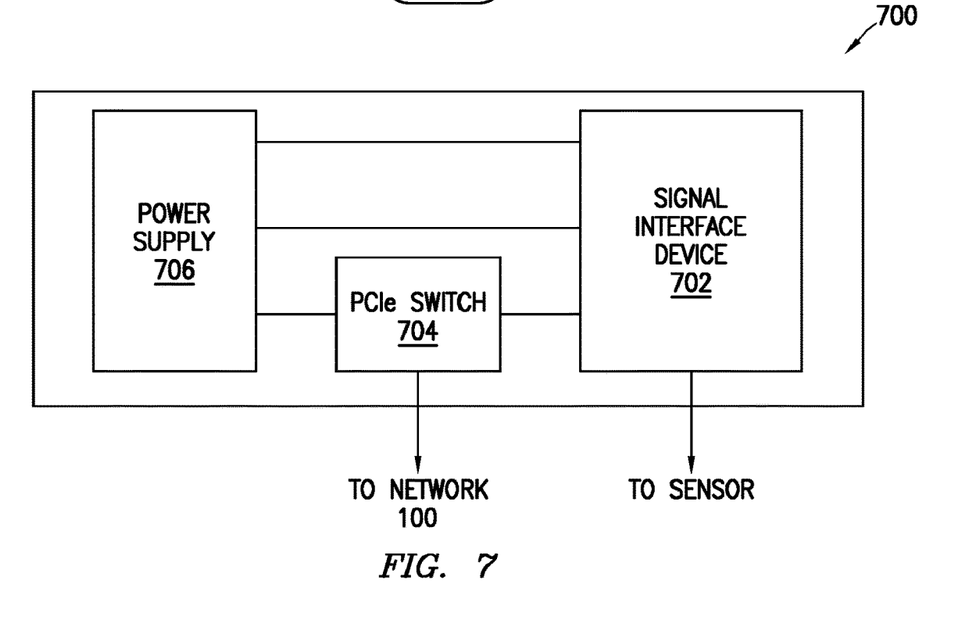
FIG. 7 shows a block diagram of a device in accordance with at least some embodiments.

FIG. 7 shows a service point device 700 in accordance with some embodiments. Service point device 700 includes a signal interface device 702. As will be described in further detail in conjunction with FIG. 7, signal interface device 702 may connect to one or more sensors and provide an interface to a network. Signal interface device 702 may connect to a network via a network device, such as switch 704. In particular switch 704 may be a PCIe switch in at least some embodiments of service point device 700. Switch 704 may then provide the connection of service point device 700 to a network, such as ring-based interconnect network 100, FIG. 1. In the context of a network such as network 100, signal interface device may be an end-point node such as an end-point node 1061-1066. Power to signal interface device 702 and switch 704 may be provided by a power supply 706.

Figure 8A:
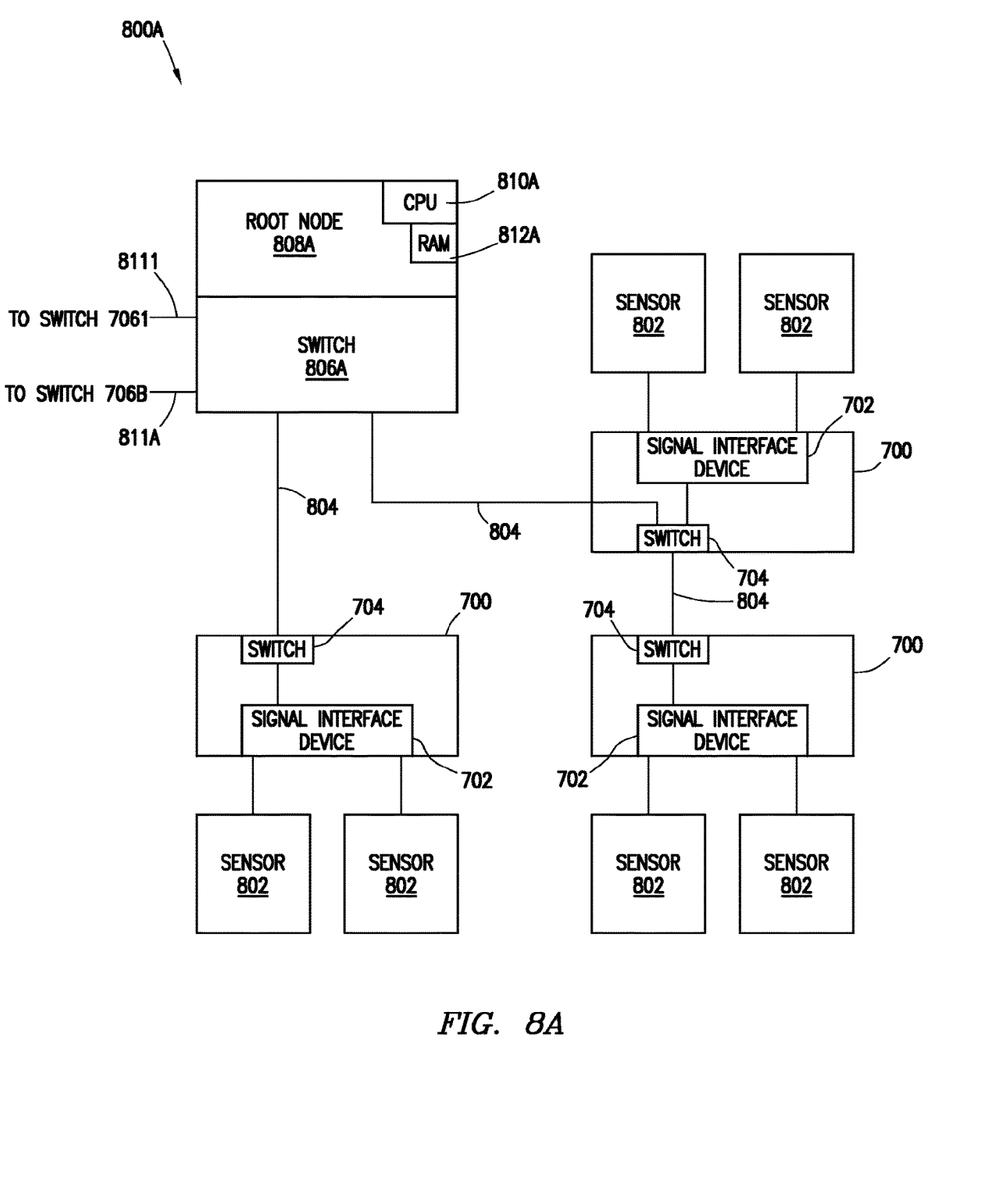
FIG. 8A shows a block diagram of a portion of a network in accordance with at least some embodiments.
Figure 8B:
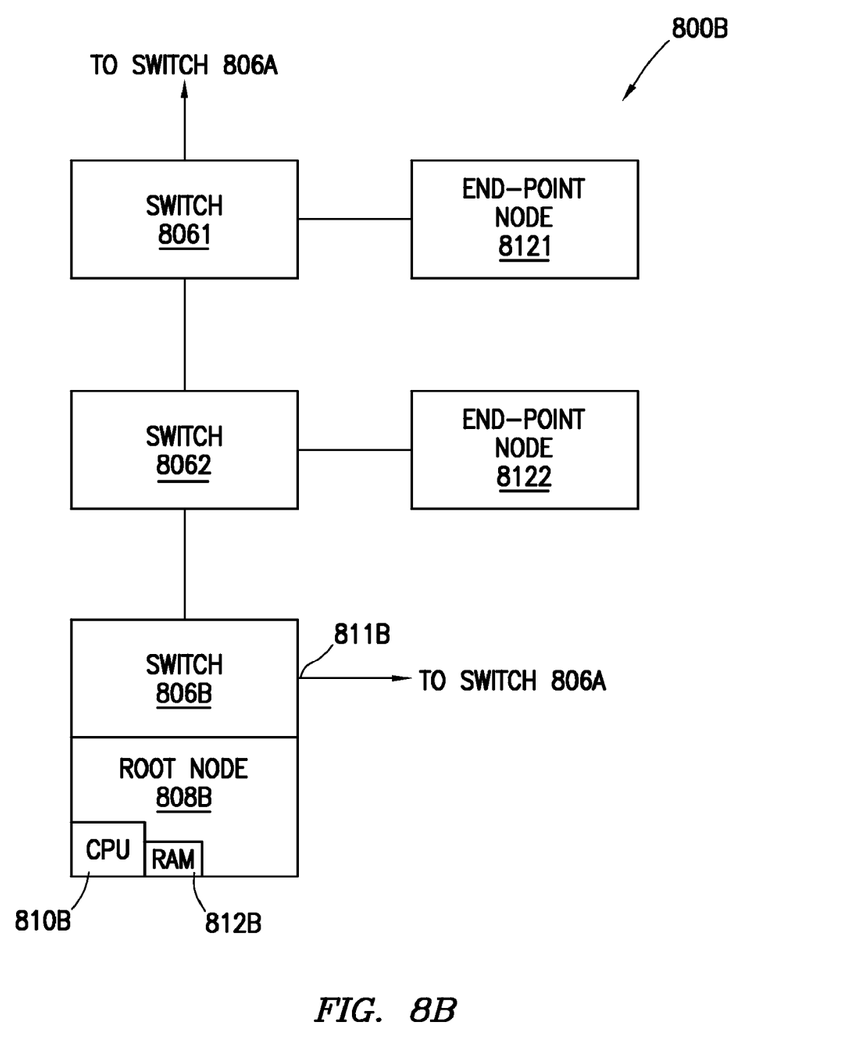
FIG. 8B shows another portion of the network of FIG. 8A.

The incorporation of service point device 700 in a network may be further appreciated by referring to FIGS. 8A and 8B. FIGS. 8A and 8B show portions 800A and 800B, respectively of a network 800 in accordance with at least some embodiments. Network 800 may comprise a ring-based topology similar to the examples of FIGS. 1 and 2. Network 800 includes service point devices 700. A plurality of sensors 802 are coupled to respective ones of signal interface devices 702 in service point devices 700. Power supplies 706 have been omitted in FIG. 7 for ease of illustration. Sensors 802 may be an end-point device that either creates or consumes data on an interface that is not network native. Examples include analog I/O devices such as analog instrumentation, digital I/O devices that are not network native, such as ARINC-429 bus devices, MIL-STD-1553 bus devices, Ethernet network interconnect cards (NIC), serial peripheral interface (SPI) devices, controller area network (CAN) devices, or radios and similar analog devices, or embedded processor systems without a network-native interface card and the like. Although two sensors 802 are shown coupled to each of signal interface devices 702, the principles described herein are not limited to two sensors and one, two, or more sensors may be coupled to a signal interface device as determined by a particular application. Data from sensors 802 may be communicated over link segments 804 via switch 806A to root node 808. Root node 808A may include a CPU 810A. Data communicated to root node 808A in this way may then be processed by CPU 810A. A random access memory (RAM) 812A may be included and coupled to CPU 810A to provide programming instructions to CPU 810A. For example, programming instructions stored in RAM 812A may be executed by CPU 810A to perform actions in conjunction with processes 300 and 600 described above in conjunction with FIGS. 3 and 6, respectively. In some embodiments, RAM 812A may be comprised, at least in part, of non-volatile memory, such as flash memory. However, any suitable memory technology may be used.

Further, switch 806A may be connected via port 8111 to a switch 8061. An end-point node 8121 may also be connected to switch 8061 and switch 8061 further connected to switch 8062. End-point node 8121 and end-point node 8122 connected to switch 8062, may comprise service point devices, but either additionally or alternatively might comprise other end-point devices also. Switch 8062 may also be coupled to switch 806B and thereby to root node 808B.

Switch 806B may be connected to a second port, port 811A on switch 806A in accordance with the ring-based topology principles described herein. In this way, SPF mitigation may be provided as set forth hereinabove in conjunction with FIGS. 1-6. Switch 806B may be coupled to a root node 808B which may also comprise a CPU, CPU 810B. Root node 808B may also include RAM 812B. Similar to RAM 812A, RAM 812B may be coupled to and provide programming instructions to CPU 810B, including programming instructions for performing actions in conjunction with processes 300 and 600.

The above discussion is meant to be illustrative of the principles and various embodiments of the present invention. Numerous variations and modifications will become apparent to those skilled in the art once the above disclosure is fully appreciated. For example, the ring-based network interconnect may be extended to any number of network devices and rings. It is intended that the following claims be interpreted to embrace all such variations and modifications.

What is claimed is:

1. A network comprising:
   a first root node connected to a first port of a first switch;
   a second root node connected to a first port of a second switch;
   a first link connected to a second port of the first switch and connected to a second port of the second switch, wherein at least one of the second port of the first switch and the second port of the second switch comprises a transparent port, and wherein in response to failure of the first link the transparent port may be reset to a non-transparent port; and
   a second link connected to a third port of the first switch and connected to a third port of the second switch, wherein at least one of the third port of the first switch and the third port of the second switch comprises a non-transparent port comprising a non-transparent bridge, and wherein in response to failure of the second link the non-transparent port may be unset as a transparent port.

2. The network of claim 1 wherein the first link comprises:
   a first link segment, the first link segment having a first end connected to the second port of the first switch and a second end connected to a first port of a third switch; and
   a second link segment, the second link segment having a first end connected to a second port of the third switch and having a second end connected to the second port of the second switch.

3. The network of claim 1 wherein the first link is configured to connect to a non-transparent port of the first switch upon initiation of the network.

4. The network of claim 2 wherein at least one of the first port of the third switch and the second port of the third switch comprises a non-transparent bridge.

5. The network of claim 1 wherein the first root node comprises a processor (CPU).

6. The network of claim 2 further comprising a first end-point node connected to a third port of the third switch.

7. The network of claim 6 wherein the first end-point node comprises a service point device.

8. The network of claim 7 wherein the service point device comprises a signal interface device.

* * * * *